United States Patent [19]
Dawson

[11] Patent Number: 5,318,328
[45] Date of Patent: Jun. 7, 1994

[54] QUICK CONNECT DEVICE WITH MAGNET FOR CLOTHES DRYER EXHAUST HOSE

[76] Inventor: Hugh R. Dawson, 755 Long Ridge Rd., Stamford, Conn. 06902

[21] Appl. No.: 76,415

[22] Filed: Jun. 11, 1993

[51] Int. Cl.$^5$ ............................................. F16L 37/00
[52] U.S. Cl. ..................................... 285/9.1; 285/903; 285/175; 285/423
[58] Field of Search ................. 285/175, 177, 9.1, 903, 285/423; 277/80; 439/38; 24/303; 403/DIG. 1; 34/235; 454/903

[56] References Cited

U.S. PATENT DOCUMENTS

| | | | |
|---|---|---|---|
| 3,181,895 | 5/1965 | Cator | 285/9.1 |
| 3,280,896 | 10/1966 | Goodson et al. | 285/9.1 |
| 3,616,622 | 11/1971 | Friedman | 285/9.1 |
| 3,892,049 | 7/1975 | Adams, Jr. | 454/903 |
| 4,049,295 | 9/1977 | Piers | 285/9.1 |
| 4,051,768 | 10/1977 | Bayles | 285/9.1 |
| 4,081,915 | 4/1978 | Materniak et al. | 34/235 |
| 4,708,370 | 11/1987 | Todd | 285/12 |
| 4,746,149 | 5/1988 | Thompson | 285/175 |
| 4,887,852 | 12/1989 | Hancock | 285/175 |
| 4,923,224 | 5/1990 | Makris | 285/177 |
| 5,109,756 | 5/1992 | Barboza et al. | 454/284 |
| 5,121,948 | 6/1992 | Anderson et al. | 454/903 |
| 5,199,190 | 4/1993 | Mayer et al. | 34/235 |
| 5,257,468 | 11/1993 | Lebrun | 34/235 |

FOREIGN PATENT DOCUMENTS

| | | | |
|---|---|---|---|
| 1466542 | 1/1967 | France | 285/9.1 |
| 1492158 | 7/1989 | U.S.S.R. | 285/9.1 |

*Primary Examiner*—Eric K. Nicholson
*Attorney, Agent, or Firm*—Ohlandt, Greeley & Ruggiero

[57] ABSTRACT

A quick connect device for coupling a vent or exhaust hose to the exhaust pipe of a clothes dryer or the like, the device having a tubular member of unitary construction with a first, female end portion and a second, male end portion; the first portion including magnetic material for magnetically engaging with a exhaust pipe of dryer, the second portion threadably engaged with an exhaust hose.

3 Claims, 1 Drawing Sheet

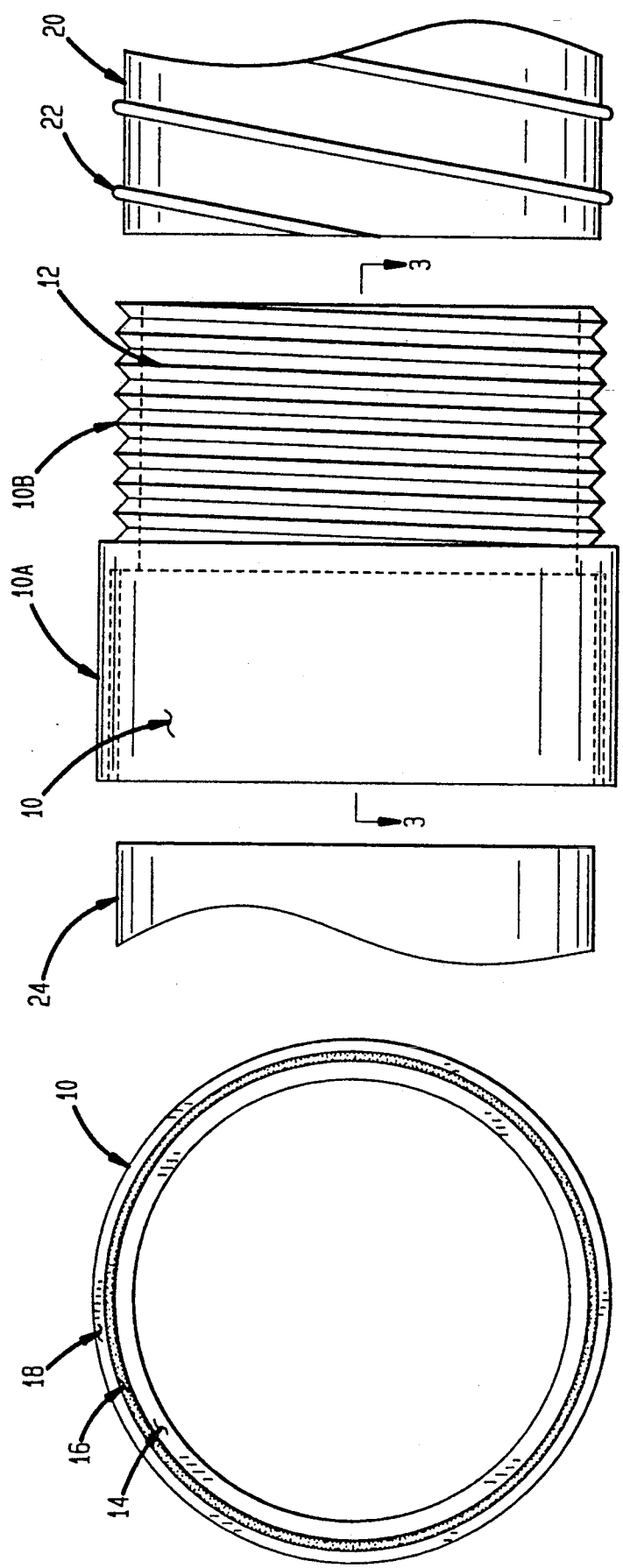

QUICK CONNECT DEVICE WITH MAGNET FOR CLOTHES DRYER EXHAUST HOSE

This invention relates generally to an arrangement for coupling a vent or exhaust hose to the exhaust pipe of a clothes dryer or the like, more particularly to a quick connect tubular device or coupler for such purpose.

BACKGROUND OF THE INVENTION

The literature is bereft of devices which enable quick and simplified coupling of a vent or exhaust hose to the exhaust pipe, for example, of a clothes dryer or the like. A variety of types of coupling means which function to fulfill the general purpose have been known in the art, one of which consists of a circular clamp adapted to attach exhaust hoses to clothes dryer exhaust pipes. One such type consists of a narrow metal band which fits around the exhaust hose and is tightened by turning a machine screw with a screwdriver. Another type is a circular spring clamp which also fits over the hose. The clamps are used to clamp the exhaust hose directly to the exhaust pipe.

It will be appreciated that the described clamps are difficult to use because dryers are manufactured with little working space around the exhaust pipe. Typically, the metallic exhaust pipe at the rear of a dryer terminates flush with the back of the dryer, and the dryer back has a shallow circular depression around the exhaust pipe. In order to use one of these clamps, it is necessary, first of all, that the clamp be put over the hose; then the hose must be placed over the end of the exhaust pipe. The exhaust hose fits over the pipe and, because there is little working room, it is hard to slide the hose onto the pipe to allow secure clamping. Furthermore, after the hose is on the pipe, a clamp must be moved into place and, in the first case cited, the machine screw must be tightened. However, a screwdriver cannot be aligned with the machine screw, because the clamp must be inside the plane of the dryer back in order to clamp the hose on the pipe. Thus, the screwdriver must be held off line to tighten the screw while holding the hose and clamp on the pipe.

As will be understood, the above described procedure is awkward and frequently results in less than secure clamping which allows the hose to slip off later when the dryer is vibrating during an operating cycle. The other type of clamp, that is, the spring clamp noted above must be gripped with a pair of pliers to hold it open while it is being moved into position so as to clamp the hose on the exhaust pipe. This is also a difficult feat which produces the same results as the first type of clamp described.

Other types of coupling devices known in the art are disclosed in U.S. Pat. Nos. 4,708,370 (Todd), 4,746,149 (Thompson), 4,887,852 (Hancock), 4,923,224 (Makris), and 5,109,756 (Barboza et al.).

Of particular note is U.S. Pat. No. 4,708,370, which is concerned with a recreational vehicle discharge pipe coupler and, in particular, discloses a device for coupling a drain pipe to a recreational vehicle discharge pipe fitting of a type having a terminal end portion with a plurality of locking pins extending radially outward from the periphery of the pipe fitting. As such, the female end of the coupling includes corresponding slots which secure about the locking pins by suitable rotation of the female end into mating position with terminal end portion of the discharge pipe. This coupler also utilizes a seal to prevent leakage of the liquid being drained.

U.S. Pat. No. 4,746,149 has a similar scheme to that of U.S. Pat. No. 4,708,370 involving a pair of slot and stud connected units for use between water conduits, such as a garden hose and faucet, an O-ring being provided to prevent escape of water between the units.

Whatever the merits in advantages of the prior devices described, none of them is capable of providing the features in advantages of the present invention. Manifestly, the devices described in the particular noted patents are dependent on having a discharge pipe or the like that is already provided with pins in this totally unavailing for use with a pipe lacking these.

Accordingly, it was a primary object of the present invention to provide a quick connect device that constitutes a simple economical, fast and secure means for coupling or attaching an exhaust hose to the exhaust pipe of a clothes dryer or the like, and also constitutes a means for detaching such hose.

SUMMARY OF THE INVENTION

A primary feature of the present invention resides in the arrangement of a quick connect device for coupling or connecting a vent or exhaust hose to the exhaust pipe of a clothes dryer or the like, the device comprising: a tubular member of unitary construction having a first tubular end female portion and a second tubular end male portion, the first portion having a larger diameter than the second portion, the first portion including magnetic material for engagement with a metallic exhaust pipe of a clothes dryer.

A more specific feature is the provision for a magnetic lining at the inner periphery of the first tubular end female portion for ensuring sliding magnetic coupling of the quick connect device to the exhaust pipe.

Other and further objects, advantages and features of the present invention will be understood by reference to the following specification in conjunction with the annexed drawings, wherein like parts have been given like numbers.

BRIEF DESCRIPTION OF THE DRAWING

FIG. 1 is a side view of the quick connect device of the present invention and an exhaust hose;

FIG. 2 is an end view from the large end of the device, that is, from the left end as seen in FIG. 1; and FIG. 3 is a side wall cross section taken on the line 3—3 to FIG. 1.

DESCRIPTION OF PREFERRED EMBODIMENT

Referring now to the figures of the drawing, there is seen the device of the present invention constituting a simple, fast and secure means of attaching and detaching an exhaust hose to a clothes dryer exhaust pipe or the like.

The quick connect device 10 comprises two portions: portion 10A which surrounds the protruding exhaust pipe of a typical clothes dryer used in the home or for commercial purposes; and portion 10B which has external grooves 12 which typically may be 4/32 of an inch deep and 8/32 of an inch on center to form a suitable thread.

The entire quick connect device can be of plastic, for example, polyvinylchloride (PVC) or other suitable material. However, the interior of the larger portion 10A is provided with magnetic material at its inner periphery. This material may be deployed in a variety of ways; however, as will be seen in FIG. 3, such magnetic material is disposed on the inner peripheral surface of the quick connect device 10 (at the large end or large portion 10A) and extends, for example, for about 1¾" of the axial length of device 10 (as shown in FIG. 3) to a point at which a shoulder 14 is formed. This shoulder acts as a stop device and precludes the penetration of the dryer pipe beyond this point at the interior of the quick connect device.

It will also be noted that the axial extent of the outer periphery of larger portion of 10A is selected in this one example to be approximately two inches, whereas the portion 10B having grooves 12 is selected to be two inches in axial length. With respect to the outer diameter of portion 10A, it would be selected in this example to be approximately 4 and 10/32 of an inch.

The inner diameter of the large portion 10A would be four inches (and including the magnetic ring 16) the magnetic ring being chosen to be 2/32 of an inch in thickness, (the added outer ring surrounding the magnetic ring having a thickness of approximately 3/32 of an inch). The wall thickness of portion 10B would be 6/32 inches including the grooves which are 4/32 of an inch deep. The inner diameter of 10B is 3/32 of an inch.

It will be understood that the dimensions of the quick connect device 10 given above are approximations and can be suitably modified to handle the variety of sizes for clothes dryers that may exist; for example, there may be some dryers with four inch exhaust pipes and others may utilize three inch exhaust pipes.

The procedure for coupling a dryer hose to an exhaust pipe, using the quick connect device, is as follows. The exhaust hose 20, as seen fragmentarily in FIG. 1, is threaded onto the male end, that is, the end of the smaller portion 10B of the device, by turning the quick connect device 10 counter clockwise and allowing the helically wound wire 22 ensconced within the hose 20, and which projects beyond the outer periphery of the exhaust hose 20, to mate with the threads, i.e., the grooves 12 in the quick connect device 10. When the exhaust hose 20 is fully threaded onto the device 10, the hose 20 will be securely attached. Then the large end of the device 10, the female end of the large portion 10A, is slidably extended over the metal exhaust pipe 24 (seen fragmentarily), which is located on the back side of the dryer. The magnetic lining or coating 16 at the inner periphery of portion 10A is of such dimensions as to magnetically engage with and surround the pipe. Since the metal pipe on the clothes dryer has magnetic characteristics, the quick connect device will be held on the metal pipe until removal is desired, at which point a reasonably substantial tug on the quick connect device will cause it to slide off the metal pipe.

It is comtemplated that any conventional exhaust hose can be securely affixed to a dryer exhaust pipe by use of the quick connect device according to the present invention. Some examples of conventional exhaust hoses are flexible aluminum piping, rigid metal piping, and rigid polyvinylchloride (PVC) piping. One preferred exhaust hose is flexible hose formed from a coiled spring imbedded within a plastic casing which follows the helical outline of the coiled spring to cause the drainpipe to assume a corrugated shape.

For what has been described, it will be appreciated that the present invention overcomes the problems inherent in the existing technology. No tools are required and the lack of working space around the dryer exhaust pipe becomes a non-problem. Ordinarily, considerable dexterity is required when using either of the two previously described types of clamps to attach a dryer hose. In contrast therewith, a person with no mechanical talent can easily attach an exhaust hose to a dryer exhaust pipe using the quick connect device of the present invention.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A quick connect device for coupling or connecting a vent or exhaust hose to the metallic exhaust pipe of a clothes dryer, said device comprising;

a tubular member of unitary construction having a first tubular end female portion and a second tubular end male portion, said first tubular end female portion having a larger diameter than said second tubular end male portion, said first tubular end female portion including a magnetic material which is disposed at the inner periphery of said first tubular end female portion for sliding magnetic coupling with the outer periphery of said metallic exhaust pipe.

2. A device as defined in claim 1, in which the tubular member is composed of polyvinylchloride.

3. A device as defined in claim 1, to which second tubular end portion is provided with grooves so as to engage threadably with said exhaust hose having a mating helical wire configuration.

* * * * *